(12) United States Patent
Morioka et al.

(10) Patent No.: US 8,923,752 B2
(45) Date of Patent: Dec. 30, 2014

(54) RELAY STATION FOR RELAYING COMMUNICATION BETWEEN USER APPARATUS AND BASE STATION, AND RELAY METHOD

(75) Inventors: Yasufumi Morioka, Tokyo (JP); Akira Yamada, Tokyo (JP); Hideaki Takahashi, Tokyo (JP); Mikio Iwamura, Tokyo (JP); Junichiro Hagiwara, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/878,157

(22) PCT Filed: Sep. 27, 2011

(86) PCT No.: PCT/JP2011/072107
§ 371 (c)(1),
(2), (4) Date: Apr. 5, 2013

(87) PCT Pub. No.: WO2012/046596
PCT Pub. Date: Apr. 12, 2012

(65) Prior Publication Data
US 2013/0203342 A1    Aug. 8, 2013

(30) Foreign Application Priority Data

Oct. 6, 2010  (JP) .................................. 2010-226799

(51) Int. Cl.
*H04B 3/36* (2006.01)
*H04B 7/14* (2006.01)
*H04W 88/04* (2009.01)
*H04B 7/155* (2006.01)
*H04W 28/18* (2009.01)
*H04W 84/04* (2009.01)

(52) U.S. Cl.
CPC ........... *H04W 88/04* (2013.01); *H04B 7/15507* (2013.01); *H04B 7/15528* (2013.01); *H04W 28/18* (2013.01); *H04W 84/047* (2013.01)
USPC ............................................... 455/7; 455/450

(58) Field of Classification Search
CPC ... H04W 88/04; H04W 28/18; H04W 84/047; H04B 7/15528; H04B 7/15507
USPC ............................................ 455/445, 450, 7
See application file for complete search history.

(56) References Cited

U.S. PATENT DOCUMENTS

2010/0265873 A1* 10/2010 Yi et al. ....................... 370/315

FOREIGN PATENT DOCUMENTS

WO    2010/048577 A1    4/2010

OTHER PUBLICATIONS

International Search Report issued in PCT/JP2011/072107 mailed Oct. 25, 2011 (4 pages).

(Continued)

*Primary Examiner* — Ping Hsieh
(74) *Attorney, Agent, or Firm* — Osha Liang LLP (57) ABSTRACT

A relay station includes a signal generation unit configured to generate a signal in the relay station and a receiving unit configured to receive a signal from a first communication station. The relay station further includes a signal generating node identifying unit configured to identify whether a signal to be transmitted to a second communication station is a received signal received from the first communication station or a generated signal generated by the signal generation unit. The relay station further includes a signal transmission unit configured to transmit both or one of the received signal and the generated signal associated with a radio bearer to the second communication station.

8 Claims, 9 Drawing Sheets

(56) References Cited

OTHER PUBLICATIONS

Written Opinion issued in PCT/JP2011/072107 mailed Oct. 25, 2011 (3 pages).
Japanese Office Action for Application No. 2010-226799, mailed on Oct. 25, 2011 (4 pages).
NEC, "Common radio bearer configuration for Un", 3GPP TSG-RAN WG2 Meeting #67; R2-094752; Shenzen, China; Aug. 24-28, 2009 (4 pages).
LG Electronics Inc., "Bearer Mapping in Relay Node", 3GPP TSG-RAN2 Meeting #66; R2-092845; San Francisco, USA; May 4-8, 2009 (4 pages).
Institute for Information Industry (III), Coiler, "Management of QoS on the Un Interface", 3GPP TSG-RAN WG2 Meeting #67; R2-094837; Shenzhen, China; Aug. 24-28, 2009 (5 pages).
3GPP TR 36.806 V9.0.0; "3rd Generation Partnership Project; Technical Specification Group Radio Access Network; Evolved Universal Terrestrial Radio Access (E-UTRA); Relay architectures for E-UTRA (LTE-Advanced) (Release 9)"; Mar. 2010 (34 pages).
Office Action issued in Chinese Application No. 201180048297.3 mailed on Jan. 6, 2014 (18 pages).
Extended European Search Report in counterpart European Application No. EP11830529.1 mailed on Apr. 11, 2014 (10 pages).
Fujitsu; "Multiplexing for Un Interface"; 3GPP TSG-RAN WG2 Meeting #69, R2-101454; San Francisco USA; Feb. 22-26, 2010 (4 pages).
LG Electronics Inc; "Bearer Mapping in Relay Node"; 3GPP TSG-RAN2 Meeting #67, R2-094636; Shenzhen, China; Aug. 24-Aug. 28, 2009 (4 pages).

* cited by examiner

| Uu-QCI | Un-QCI |
|---|---|
| 1 | 1 |
| 2 | |
| 3 | 3 |
| 4 | 4 |
| ⋮ | ⋮ |
| 31 | 20 |
| 32 | |
| ⋮ | ⋮ |

RELAY STATION FOR RELAYING COMMUNICATION BETWEEN USER APPARATUS AND BASE STATION, AND RELAY METHOD

RELATED APPLICATIONS

This application is a National State application of International Patent Application No. PCT/JP2011/072107, filed on Sep. 27, 2011, which claims priority pursuant to 35 U.S.C. §119(a) to Japanese patent application No. 2010-226799, filed on Oct. 6, 2010. Both Japanese patent application No. 2010-226799 and International Patent Application No. PCT/JP2011/072107 are hereby incorporated by reference in their entirety.

BACKGROUND OF THE INVENTION

1. Technical Field

One or more embodiments of the present invention relate to a relay station and a relay method for relaying communication between a user apparatus and a base station 2. Background Art In a cellular mobile communication system, in order to enlarge coverage of a cell and/or in order to realize load distribution in a base station (eNB), there is a case where a relay station (relay node: RN) is provided between the base station (eNB) and a user apparatus (UE). The base station (eNB) in this case functions as a parent station, and may be referred to as a donor base station (donor eNodeB: DeNB). However, as long as there is no fear of confusion, a donor base station as well as a base station which is not a donor base station may be referred to as eNB. Although the user apparatus (UE) is a mobile station typically, it may be a fixed station. A radio interface between the base station (eNB) and the relay station (RN) is referred to as "Un". A radio interface between the relay station (RN) and the user apparatus (UE) is referred to as "Uu".

Figure 1:
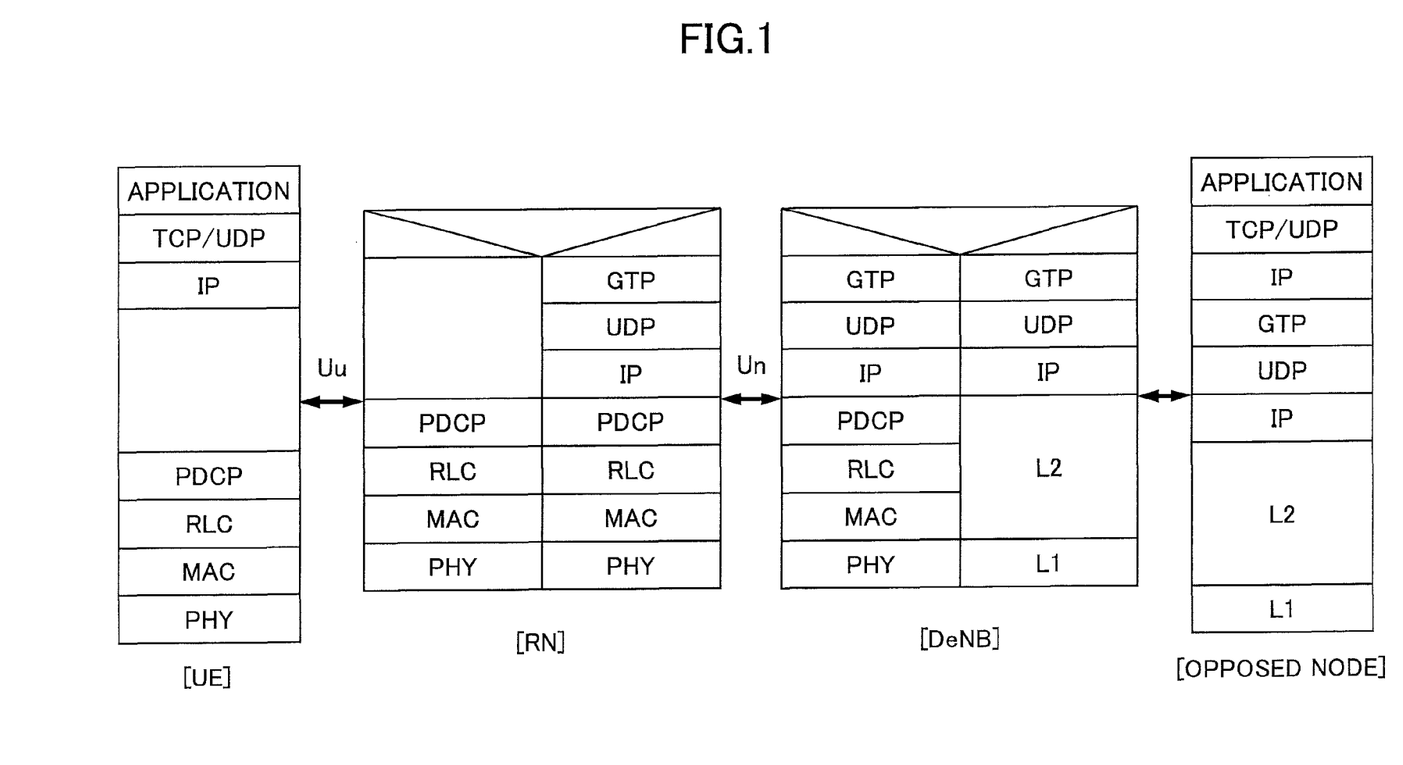
FIG. 1 is a diagram showing protocol stacks of each node in a communication system.

FIG. 1 shows protocol stacks on a user plane of various nodes in a communication system. FIG. 1 shows protocol stacks of each of a user apparatus (UE), a relay station (RN), a base station (DeNB) and an opposing node. The opposing node is a node which is a communication partner of the user apparatus (UE). The user apparatus (UE) includes, in order from the higher layer, an application layer, a TCP/IP layer, an IP layer, a PDCP layer, an RLC layer, a MAC layer and a PHY layer. The relay station (RN) includes, in order from the upper layer, a PDCP layer, an RLC layer, a MAC layer, and a PHY layer, for communication with the user apparatus (UE). Also, for communication with the donor base station (DeNB), the relay station (RN) includes, in order from the upper layer, a GTP layer, a UDP layer, an IP layer, a PDCP layer, an RLC layer, a MAC layer, and a PHY layer. Also, for communication with the relay station (RN), the donor station (DeNB) includes, in order from the upper layer, a GTP layer, a UDP layer, an IP layer, a PDCP layer, an RLC layer, a MAC layer, and a PHY layer. Also, for communication with the opposed node, the donor base station (DeNB) includes, in order from the upper layer, a GTP layer, a UDP layer, an IP layer, an L2 layer, and an L1 layer. The opposed node includes, in order from the upper layer, an application layer, a TCP/IP layer, an IP layer, a GTP layer, a UDP layer, an IP layer, an L2 layer and an L1 layer. Such a communication system is described in "3GPP TR36.806 v9.0.0 (2010 March) (FIG. 4.2.2-4)".

SUMMARY

As understood from FIG. 1, protocol stacks in communication are largely different between the Uu side and the Un side. This means that parameters used for communication in the Uu side and parameters used for communication in the Un side are set separately. In order to ensure proper quality of service (QoS) in communication between the user apparatus (UE) and the base station (eNB), it is necessary that parameters (especially, QoS class identifier (QCI)) in each communication are consistent with each other. However, at least at the time of filing of this application, it is not reported how to match parameters used for communication in each of the Uu side and the Un side. Also, it is not clear how the service quality is ensured in a case where the relay station transfers a packet and in a case where the relay station generates and transmits a packet.

An object of one or more embodiments of the present invention is to make it possible that a user apparatus and a base station can properly perform radio communication via a relay station even though parameters between the user apparatus and the relay station are set separately from parameters between the relay station and the base station based on respective different protocol stacks. Also, an object of one or more embodiments of the present invention is to identify a case where the relay station transfers a signal and a case where the relay station itself generates and transmits a signal so as to ensure proper service quality.

A relay station according to an embodiment is a relay station for relaying radio communication from a first communication station to a second communication station, including:

a quality class identifying unit configured to identify a first quality indicator indicating a quality expected for the radio communication based on a received signal from the first communication station;

a mapping unit configured to associate the received signal with a radio bearer having a quality indicated by a second quality indicator corresponding to the first quality indicator in a correspondence relationship between quality indicators in communication between the first communication station and the relay station, and quality indicators in communication between the relay station and the second communication station; and a transmission unit configured to transmit the received signal to the second communication station using the radio bearer.

According to this relay station, a user apparatus and a base station can properly perform radio communication via a relay station even though parameters between the user apparatus and the relay station are set separately from parameters between the relay station and the base station based on respective different protocol stacks.

A relay station according to an embodiment is a relay station for relaying radio communication from a first communication station to a second communication station, comprising:

a signal generation unit;

a receiving unit configured to receive a signal from the first communication station;

a signal generating node identifying unit configured to identify whether a signal is a received signal from the first communication station or a signal generated by the relay station;

a quality indicator conversion unit, for the received signal from the first communication apparatus, configured to associate the received signal with a radio bearer having a quality indicated by a second quality indicator corresponding to the first quality indicator in a correspondence relationship between quality indicators in communication between the first communication station and the relay station, and quality indicators in communication between the relay station and the second communication station;

a quality indicator setting unit, for the signal generated by the signal generation unit, configured to set the second quality indicator to the signal generated by the generation unit by a flow identifier so that the signal is associated with a radio bearer having a quality indicated by the second quality indicator; and a signal transmission unit configured to transmit the signal associated by the quality indicator conversion unit and the signal associated by the quality indicator setting unit to the second communication station.

According to this relay station, in a case when a relay station transfers a signal, the relay station identifies a case where the relay station itself generates and transmits a signal so as to ensure proper service quality.

DETAILED DESCRIPTION

A relay station according to an embodiment is a relay station for relaying radio communication from a first communication station to a second communication station. The first communication station is a user apparatus (UE) in uplink, and is a base station (DeNB) in downlink. A quality class identifying unit (QCI identifying unit) of the relay station (RN) identifies a first quality indicator indicating a quality expected for the radio communication based on a received signal from the first communication station. In uplink, the first quality indicator is a QoS class identifier (UuQCI) in a radio interface (Uu). In downlink, the first quality indicator is a QoS class identifier (UnQCI) in a radio interface (Uu).

A mapping unit of the relay station (RN) associates the received signal with a radio bearer having a quality indicated by a second quality indicator corresponding to the first quality indicator in a correspondence relationship between quality indicators in Uu side, and quality indicators in Un side. Then, the relay station (RN) transmits the received signal to the second communication station using the radio bearer.

According to an embodiment, a user apparatus (UE) and a base station (DeNB) can properly perform radio communication via a relay station even though parameters (Uu-QCI) between the user apparatus (UE) and the relay station (RN) are set separately from parameters (Un-QCI) between the relay station (RN) and the base station (DeNB) based on respective different protocol stacks.

One or more embodiments are described from the viewpoint of the following aspects.

1. System
2. Operation example
3. User apparatus and relay station
4. First modified example
5. Second modified example
6. Third modified example
7. Fourth modified example
8. Fifth modified example

[Embodiment 1]

<1. System>

Figure 2:
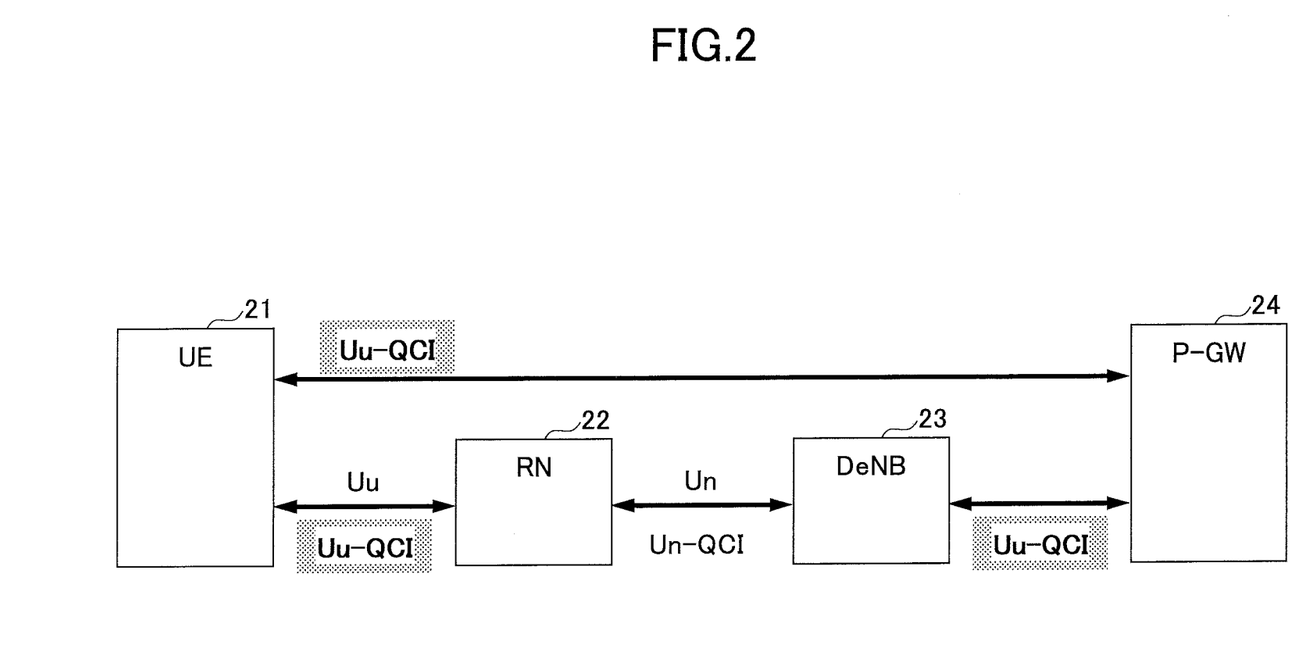
FIG. 2 shows a schematic block diagram of the communication system according to an embodiment.

FIG. 2 shows a schematic block diagram of the communication system according to an embodiment of the present invention. FIG. 2 shows a user apparatus (UE) 21, a relay station (RN) 22, a base station (DeNB) 23 and a packet data network gateway (P-GW) 24. As mentioned above, the radio interface between the user apparatus (UE) 21 and the relay station (RN) 22 is referred to as "Uu". The radio interface between the relay station (RN) 22 and the base station (eNB) 23 is referred to as "Un". The user apparatus (UE) may be any proper apparatus that can be used by a user for radio communication. The base station (DeNB) manages radio resources in addition to relaying communication between a user apparatus (UE) in a cell and an upper apparatus such as the packet data network gateway (P-GW). The relay station (RN) relays communication between the user apparatus (UE) and the base station (DeNB). The packet data network gateway (P-GW) has a connection function between a mobile communication network and an external network (the Internet and the like). In addition to that, the packet data network gateway (P-GW) assigns an IP address to the user apparatus (UE).

In order to ensure proper service quality (QoS) in communications between the user apparatus (UE) 21 and the packet data network gateway (P-GW) 24 (especially, communications between the user apparatus (UE) 21 and the base station (eNB) 23), it is necessary that parameters (especially, QoS class identifier (Quality Class Identifier: QCI)) in each radio interface are consistent with each other. The QoS class identifier is a value indicating quality that is expected for radio communication. In other words, the QoS class identifier is a value indicating priority of user data. The quality is defined by a packet loss ratio, transmission delay time and the like. Controls for each value of QCI are predefined. For example, when the value of QCI is 20, communication processing is controlled such that packet delay is less than 50 ms. As an example, in each of Uu and Un, QCI may take a value from 1 through 64 (1 may correspond to the best quality and 64 may correspond to the worst quality). But, specific numerical values are not essential in the present embodiment, and any proper value may be used. For example, quality does not necessarily correspond to the size of the number, like QCI=5, 1, 3, 2, 4, 6, 7, 8, 9 in order from the high quality side. In FIG. 2, Uu-QCI indicates a QoS class identifier in communication between the user apparatus (UE) 21 and the relay station (RN) 22, and indicates a QoS class identifier in communication between the base station (eNB) 23 and the packet data network gateway (P-GW) 24. Un-QCI indicates a QoS class identifier between the relay station (RN) 22 and the base station (UE) 23.

A logical path between the user apparatus (UE) 21 and the packet data network gateway (P-GW) 24 is transparent. But, a logical path between Uu and Un is not transparent due to difference of protocol stacks between the Un side and the Un side. As described in the following, in the present embodiment, Uu-QCI and Un-QCI are associated with each other by a predetermined correspondence relationship, and are converted in the relay station (RN) and the base station (DeNB). Accordingly, even though the section between Uu and Un is not transparent, QCIs in Uu and Un can be matched to each other.

<2. Operation Example>

Figure 3A:
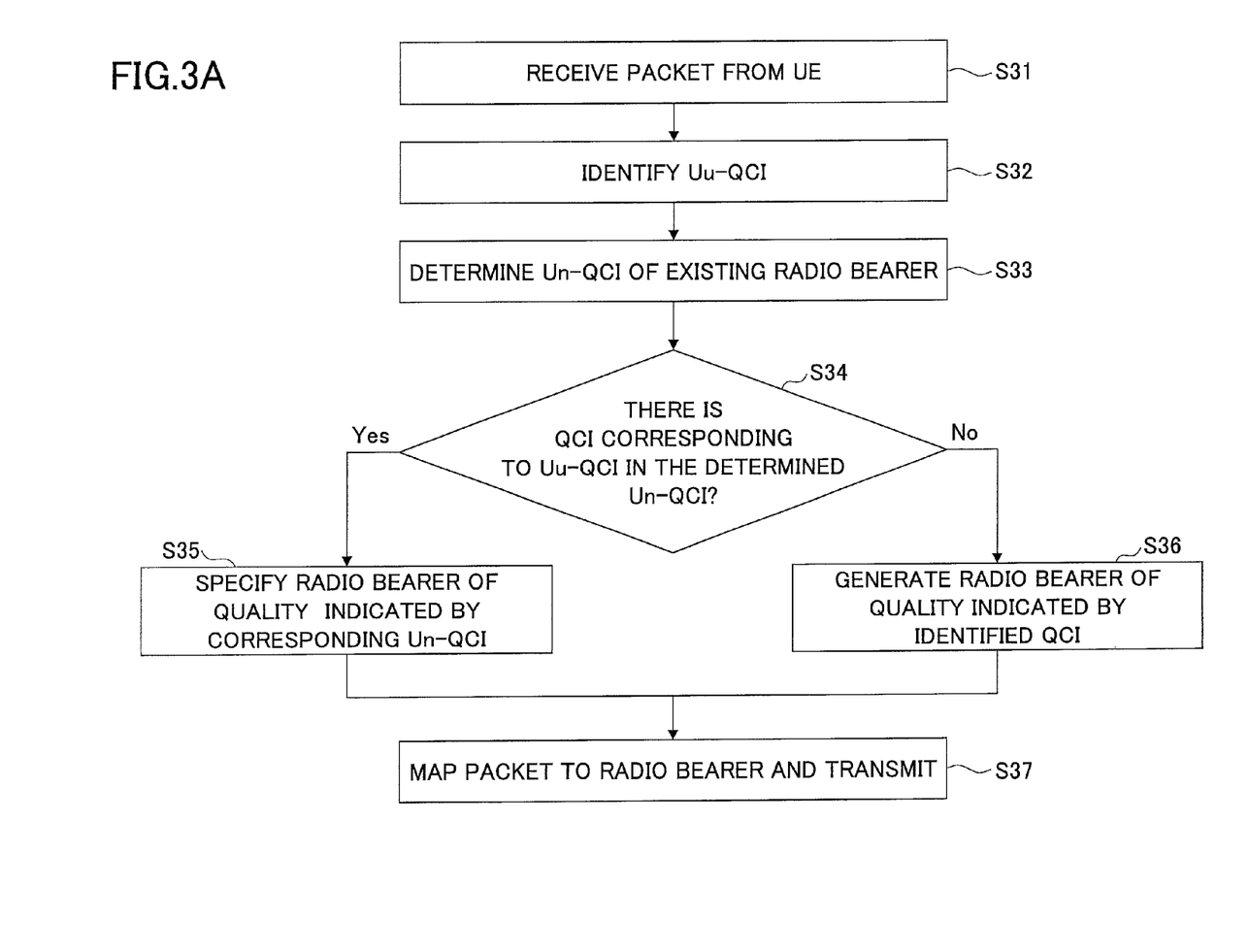
FIG. 3A is a flowchart of an operation example in uplink.

FIG. 3A shows a flowchart of an operation example used in an embodiment. This flowchart is used by the relay station (RN) in an uplink.

In step S31, the relay station (RN) receives a packet from the user apparatus (UE) via the radio interface (Uu).

In step S32, the relay station (RN) analyzes the received packet, and identifies a QoS class identifier (Uu-QCI) set for the radio interface (Uu). The QoS class identifier (Uu-QCI) may be designated in any proper method (a specific designation method is described later).

In step S33, the relay station (RN) identifies a QoS class identifier (Un-QCI) for each of one or more radio bearers that are already set between the relay station (RN) and the base station (DeNB).

Figure 3B:
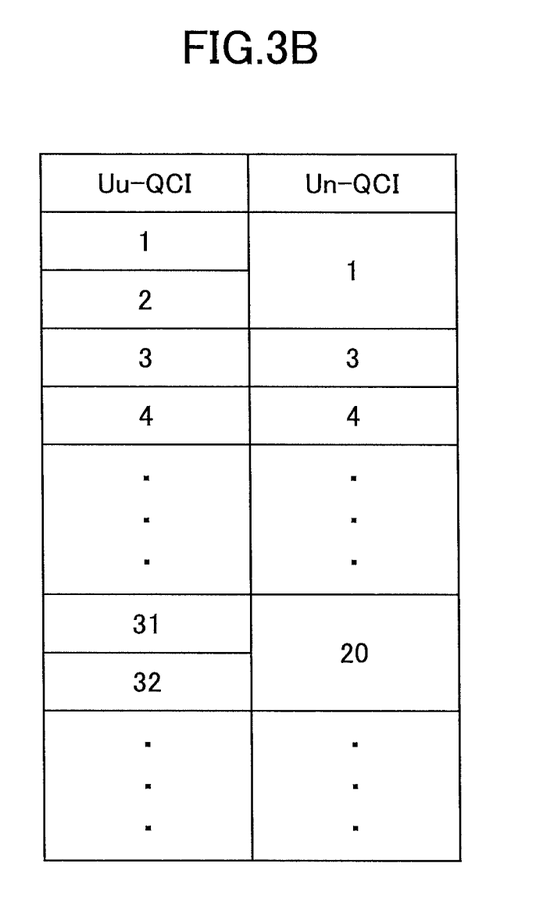
FIG. 3B is a diagram showing an example of a correspondence relationship between Uu-QCI and Un-QCI.

As shown in FIG. 3B, in the present embodiment, a correspondence relationship between various values of Uu-QCI and various values of Un-QCI is predefined. As to the correspondence relationship, each one of 64 Un-QCIs may be associated with one of 64 Uu-QCIs on a one-to-one basis, or the relationship may be one-to-many. In addition, the number of QCIs may not be 64. In any way, the corresponding relationship is already known in each node of the communication system such as the user apparatus (UE), the relay station (RN), the base station (DeNB) and the packet data network gateway (P-GW). In step S34, by referring to the corresponding relationship, it is determined whether there is QCI, in the Un-QCIs determined in step S33, that corresponds to the Uu-QCI identified in step S32. When there is a corresponding QCI, the flow goes to step S35.

In step S35, the relay station (RN) specifies an existing radio bearer having quality indicated by the Un-QCI corresponding to the identified Uu-QCI.

In step S37, the relay station (RN) maps the packet received from the user apparatus (UE) to the radio bearer specified in step S35, and transmits the packet to the base station (DeNB) via the radio interface (Un).

On the other hand, in the case where the corresponding QCI does not exist, the flow goes to step S36.

In step S36, the relay station (RN) newly generates or sets a radio bearer having quality indicated by the identified Uu-QCI.

In step S37, the relay station (RN) maps the packet received from the user apparatus (UE) to the radio bearer generated in step S36, and transmits the packet to the base station (DeNB) via the radio interface (Un).

<3. User Apparatus and Relay Station>

Figure 4:
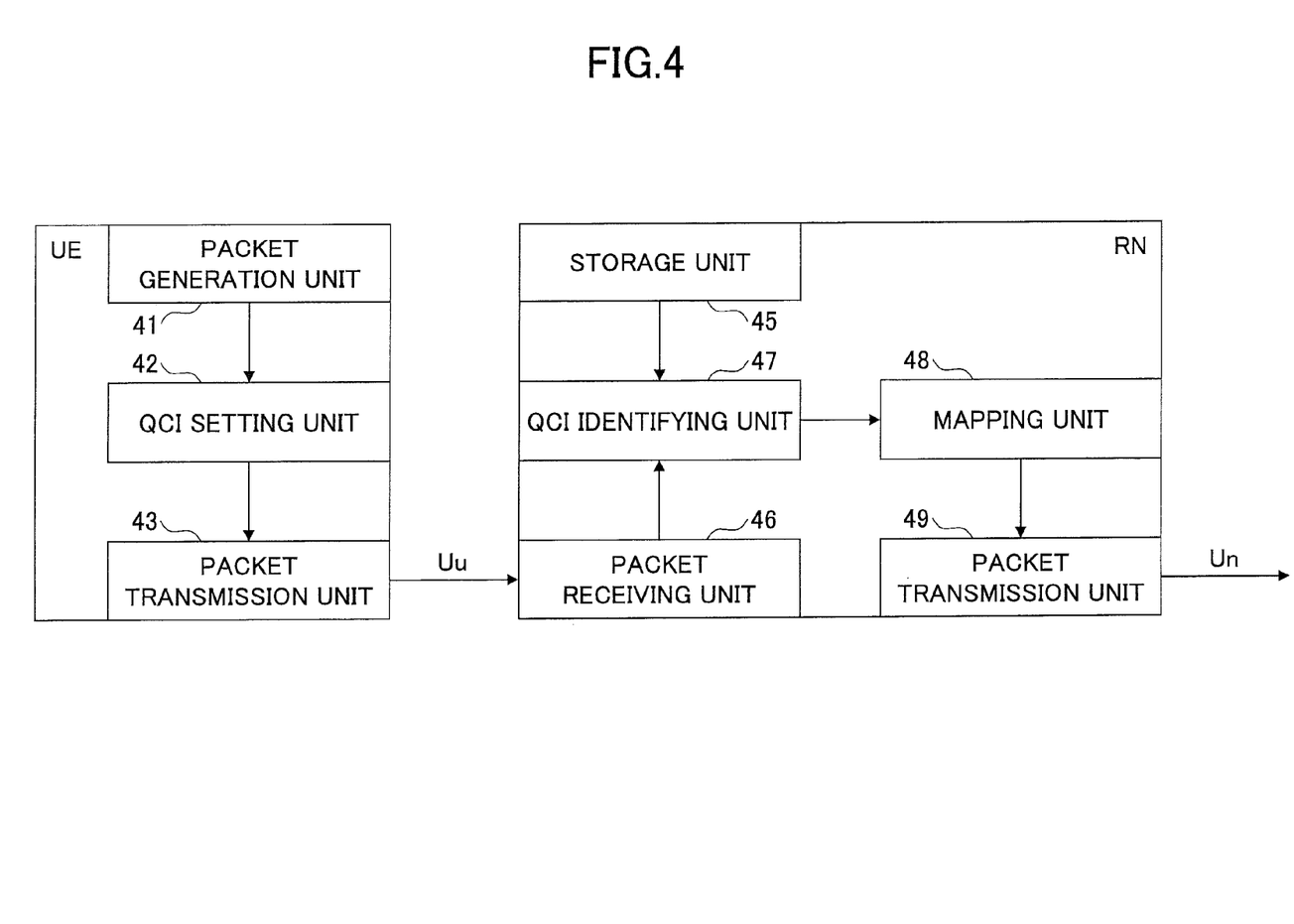
FIG. 4 is a functional block diagram of a user apparatus and a relay station.

FIG. 4 shows a functional block diagram of the user apparatus (UE) and the relay station (RN). These can be used as the user apparatus (UE) 21 and the relay station (RN) 22 shown in FIG. 2. FIG. 4 shows functional elements especially related to the present embodiment in various functional elements in the user apparatus (UE) and the relay station (RN).

The user apparatus (UE) includes a packet generation unit 41, a QCI setting unit 42 and a packet transmission unit 43. For example, the user apparatus (UE) may be any proper apparatus such as a mobile phone, an information terminal, a smart phone, a personal digital assistant, a mobile personal computer and the like.

The packet generation unit 41 generates a packet to be transmitted. For the sake of convenience, although the communication system is described as a system transmitting and receiving a packet, a signal of a communication unit other than the packet may be transmitted and received.

The QCI setting unit 42 sets a QoS class identifier (Uu-QCI) that is a quality expected for communication in the radio interface (Uu). QCI may be set with any proper criteria. For example, QCI of high quality may be set for a real time packet, and QCI of low quality may be set for a data packet of best effort. More concrete setting method is described later.

The packet transmission unit 43 transmits a packet, to which QCI is set, by radio.

The storage unit 45 stores the predetermined correspondence relationship as shown in FIG. 3B.

The relay station (RN) includes a storage unit 45, a packet receiving unit 46, a QCI identifying unit 47, a mapping unit 48 and a packet transmission unit 49.

The packet receiving unit 46 receives a packet from the user apparatus (UE) via the radio interface (Uu).

The QCI identifying unit 47 analyzes a received packet and identifies a QCI (Uu-QCI) that is set. In addition, the QCI identifying unit 47 refers to the predetermined correspondence relationship stored in the storage unit 45 so as to determine whether there is QCI corresponding to the identified QCI (Uu-QCI) in radio bearers that are already set between the relay station (RN) and the base station (DeNB). If there is not the corresponding one, a radio bearer having quality indicated by the Uu-QCI is newly generated.

The mapping unit 48 maps the received packet to the radio bearer (existing radio bearer or newly generated bearer) of QCI corresponding to the identified QCI (Uu-QCI).

The packet transmission unit 49 transmits the radio bearer on which the received packet is mapped to the base station (DeNB).

As mentioned above, according to the present embodiment, by utilizing the predetermined correspondence relationship between QCI in the Uu side and QCI in the Un side, QCI that is suitable for each radio section is set so that consistency of QCI can be ensured.

<4. First Modified Example>

The QoS class identifier (QCI) can be set for packets in various methods. For example, QCI may be derived from one or more flow identifiers included in the packet. The flow identifier indicates, for example, a source address (IP address, for example), a destination address (IP address, for example), a port number used for communication, a protocol type used for communication (TCP, for example), DSCP (Diffserv Code Point) value and the like. For example, a predetermined DSCP value or a DSCP value within a predetermined numerical range may be associated with a QCI. As an example, a DSCP value within a range from 23 to 30 is associated with QCI=32. Or, a predetermined destination address may be associated with a predetermined QCI. Further, a combination of a source and a destination may be associated with a QCI. The above-mentioned flow identifier is normally used for filtering (selecting) packets by a Traffic Flow Template (TFT) scheme. In addition, a new identifier that directly designates QCI may be included in a packet as a new flow identifier. In such a case, load for deriving QCI from one or more identifiers can be saved.

<5. Second Modified Example>

In explanation on FIGS. 3A and 4, a packet generated by the user apparatus (UE) is transmitted to the base station (DeNB) via the relay station (RN) in uplink. The concept of the embodiment can be applied not only to uplink but also to downlink. In this case, although a functional block diagram of the relay station (RN) is similar to one shown in FIG. 4, the packet receiving unit 46 receives a packet from the base station (DeNB), and the packet transmission unit 49 transmits a packet to the user apparatus (UE).

Figure 5:
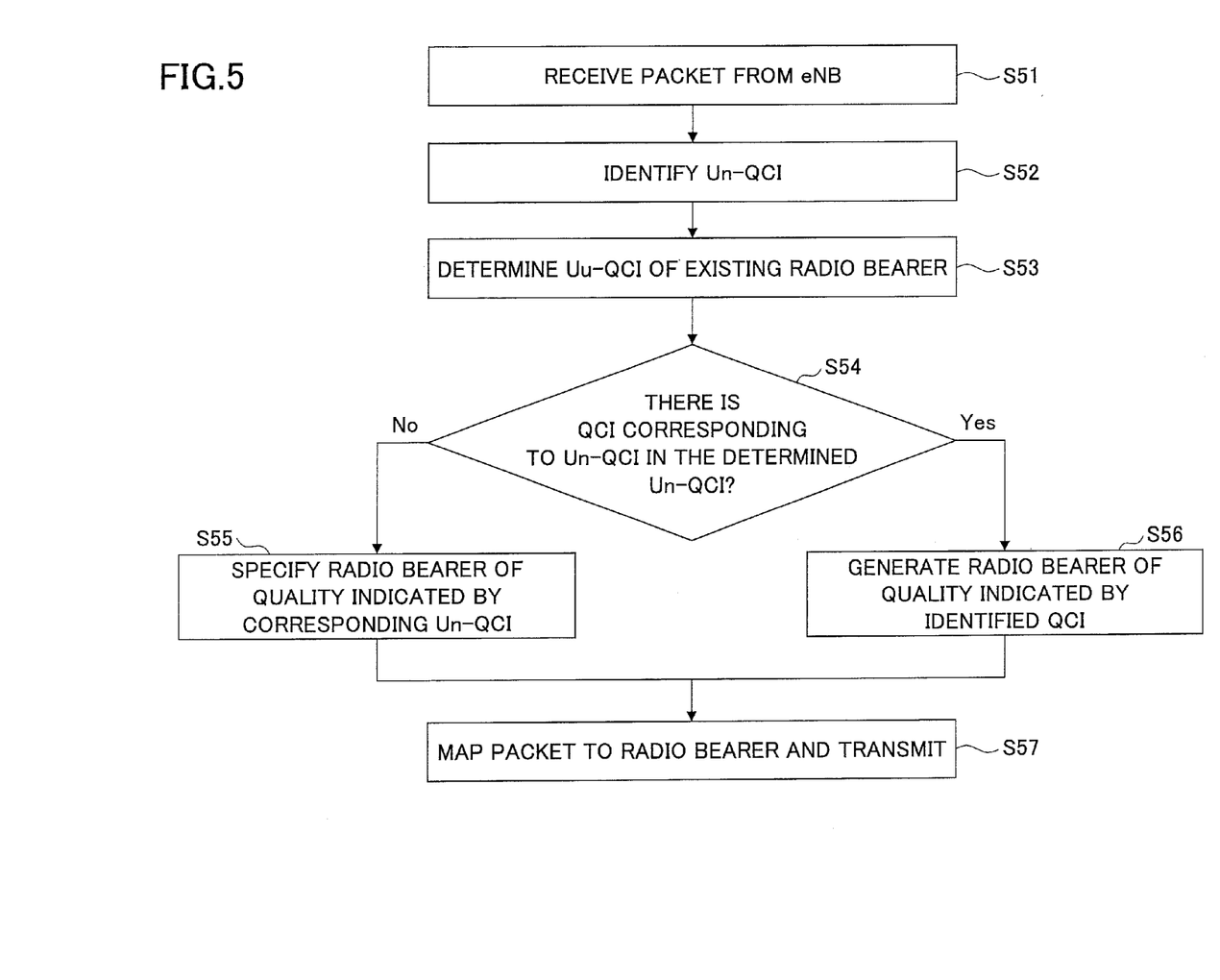
FIG. 5 is a flowchart of an operation example in downlink.

FIG. 5 shows a flowchart of an operation example in the first modified example, which indicates an operation example of the relay station (RN) in the downlink.

In step S51, the relay station (RN) receives a packet from the base station (DeNB) via the radio interface (Un).

In step S52, the relay station (RN) analyzes the received packet, and identifies a QoS class identifier (Un-QCI) set for the radio interface (Uu). The QoS class identifier (Un-QCI) may be specified in any proper method as mentioned above.

In step S53, the relay station (RN) determines the QoS class identifier (Uu-QCI) for each of one or more radio bearers that are already set between the relay station (RN) and the user apparatus (UE).

In step S54, by referring to the corresponding relationship shown in FIG. 3B, it is determined whether there is QCI, in the Uu-QCIs determined in step S53, corresponding to the Un-QCI identified in step S52. When there is the corresponding QCI, the flow goes to step S55.

In step S55, the relay station (RN) specifies an existing radio bearer having quality indicated by the Uu-QCI corresponding to the identified Un-QCI.

In step S57, the relay station (RN) maps the packet received from the base station (eNB) to the radio bearer specified in step S55, and transmits the packet to the user apparatus (UE) via the radio interface (Uu).

On the other hand, in the case where the corresponding QCI does not exist, the flow goes to step S56.

In step S56, the relay station (RN) newly generates or sets a radio bearer having quality indicated by the identified Un-QCI.

In step S57, the relay station (RN) maps the packet received from the base station (DeNB) to the radio bearer generated in step S56, and transmits the packet to the user apparatus (UE) via the radio interface (Uu).

<6. Third Modified Example>

The corresponding relationship shown in FIG. 3B is merely an example, and any proper correspondence relationship may be applied. For example, 64 QCIs for the Uu side may correspond to 64 QCIs in the Un side as it is (Uu-QCI=Un-QCI). By the way, since the relay station (RN) intermediates communication between many user apparatuses (UE) and the base station (DeNB), the relay station (RN) receives and transmits more packets (signals) than individual user apparatuses (UE) at one time. Therefore, there is a fear that quality of communication at Un in the relay station (RN) is inferior to quality of communication at Uu by the user apparatus (UE). This means that, focusing on one user apparatus (UE), the scale of quality in Uu is not the same as the scale of quality in Un. For example, quality indicated by a particular value of Uu-QCI is different from quality indicated by the same value of Un-QCI. From the viewpoint of maintaining quality even in this case, it is preferable to associate Uu-QCI of a value with Un-QCI of a value of higher quality. For example, Uu-QCI=32 is associated with Un-QCI=20 (in which QCI=1 is the best).

<7. Fourth Modified Example>

As mentioned above, the relay station (RN) converts Uu-QCI to Un-QCI in uplink, and converts Un-QCI to Uu-QCI in downlink. The QCI conversion function needs to be included not only in the relay station (RN) but also in the base station (DeNB). As shown in FIG. 2, the base station (DeNB) converts Un-QCI to Uu-QCI in uplink, and converts Uu-QCI to Un-QCI in downlink. Therefore, also the base station (DeNB) includes functional units shown in FIG. 4. More particularly, the base station (DeNB) includes a storage unit 45, a packet receiving unit 46, a QCI identifying unit 47, a mapping unit 48, and a packet transmission unit 49.

<8. Fifth Modified Example>

Figure 6:
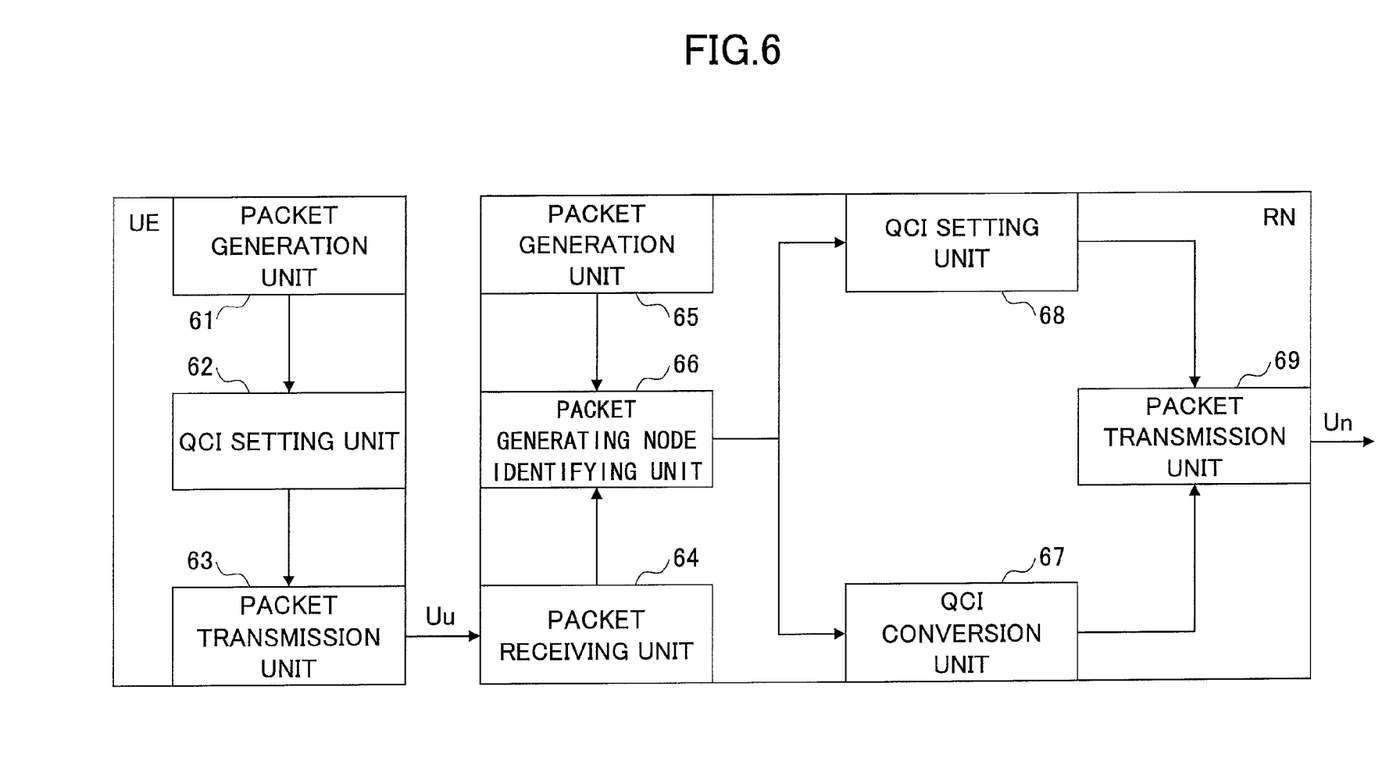
FIG. 6 is a functional block diagram of a user apparatus and a relay station in a modified example.

FIG. 6 shows a functional block diagram of the user apparatus (UE) and the relay station (RN) in the modified example. These can be used as the user apparatus (UE) 21 and the relay station (RN) 22 of FIG. 2. FIG. 6 shows functional elements particularly relevant to the present embodiment in various functional elements of the user apparatus (UE) and the relay station (RN).

In the examples of FIGS. 3A-5, the relay station (RN) receives a packet in each of the uplink and the downlink, and transmits the packet. QCI of a packet to be transmitted is derived from received QCI. Thus, in a case where the relay station (RN) transmits a packet generated by the relay station (RN) without receiving a packet, QCI cannot be properly set by the method described so far. The present modified example can support the case where the relay station (RN) generates a packet and transmits the packet.

As shown in FIG. 6, the user apparatus (UE) includes a packet generation unit 61, a QCI setting unit 62, and a packet transmission unit 63. These elements are similar to the packet generation unit 41, the QCI setting unit 42, and the packet transmission unit 43 in FIG. 4, and redundant explanation is not provided.

The relay station (RN) includes a packet receiving unit 64, a packet generation unit 65, a packet generating node identifying unit 66, a QCI conversion unit 67, a QCI setting unit 68 and a packet transmission unit 69.

The packet receiving unit 64 receives a packet from the user apparatus (UE) via a radio interface (Uu). For the sake of convenience of explanation, a packet received by the packet receiving unit 64 is referred to as a "received packet".

The packet generation unit 65 generates a packet to be transmitted to the base station (DeNB) in uplink, and generates a packet to be transmitted to the user apparatus (UE) in downlink. For the sake of convenience of explanation, a packet generated by the packet generation unit 65 is referred to as a "generated packet".

The packet generating node identifying unit 66 identifies whether a packet to be passed to the later processing element is a received packet or a generated packet. That is, the packet generating node identifying unit 66 identifies whether a node that generated the packet to be processed is another node (user apparatus (UE) or base station (DeNB)) or the own node (relay station (RN)).

When the packet to be processed is one generated by another node, the QCI conversion unit 67 analyzes the received packet, identifies QCI (identifies Uu-QCI in uplink, and identifies Un-QCI in downlink), and refers to a stored predetermined correspondence relationship so as to specify QCI corresponding to the identified QCI. The received packet is mapped to a radio bearer of quality indicated by the specified QCI. Thus, the QCI conversion unit 67 includes functional elements corresponding to the storage unit 45, the QCI identifying unit 47 and the mapping unit 48 shown in FIG. 4.

When the packet to be processed is a generated packet generated by the own node (by the packet generation unit 65 of the relay station (RN)), the QCI setting unit 68 sets a QoS class identifier (QCI) indicating an expected quality for the generated packet. The QCI may be set based on any proper criteria. For example, QCI of high quality may be set for a packet of real time data, and QCI of low quality may be set for a packet of best effort data. In addition, the QCI setting unit 68 maps the generated packet to a radio bearer of quality indicated by the QCI that is set.

The packet transmitting unit 69 transmits the radio bearer on which the received packet or the generated packet is mapped to the base station (DeNB) in uplink, and to the user apparatus (UE) in downlink.

Figure 7:
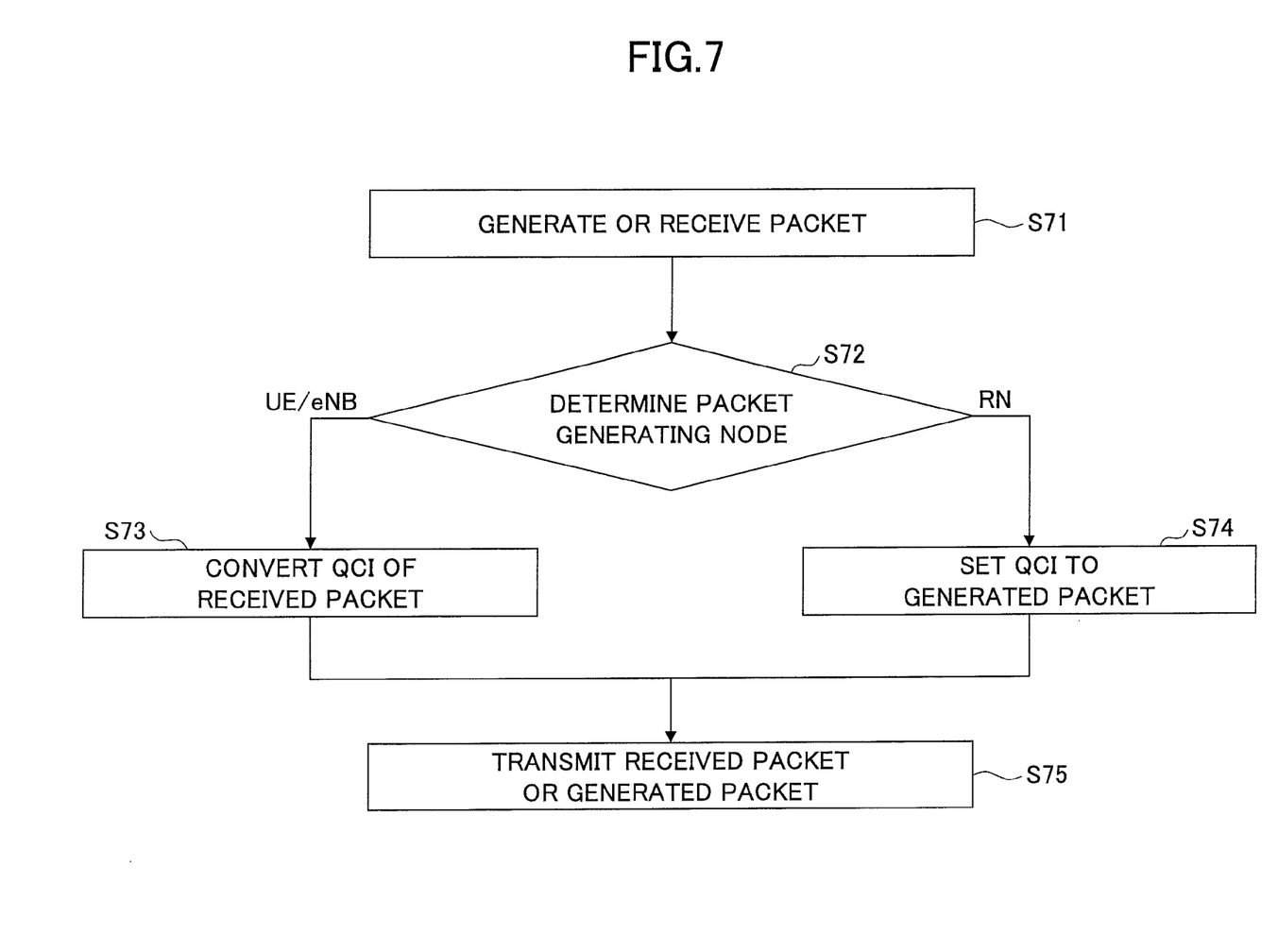
FIG. 7 is a flowchart showing an operation example in a modified example.

FIG. 7 is a flowchart showing an operation example in the modified example. This operation example is used in the relay station.

In step S71, the relay station (RN) receives a packet or generates a packet. When the relay station (RN) receives a packet, the packet is received from the user apparatus (UE) in uplink, and is received from the base station (DeNB) in downlink. In a case where the relay station (RN) generates a packet, the packet is generated by the packet generation unit 65 shown in FIG. 6.

In step S72, the relay station (RN) identifies whether the packet to be processed is a received packet or a generated packet. That is, the relay station (RN) identifies whether the node that generated the packet to be processed is another node or the own node. When the packet to be processed is a received packet (when the packet to be processed is generated by the user apparatus (UE) (in the case of uplink) or the base station (DeNB) (in the case of downlink)), the flow goes to step S73.

In step S73, the relay station (RN) determines QCI that is set in the received packet (determines Uu-QCI in the case of uplink, determines Un-QCI in the case of downlink), and specifies QCI corresponding to the determined QCI in the predetermined correspondence relationship. The received packet is mapped to a radio bearer of quality indicated by the specified QCI.

In the case when the packet to be processed is a generated packet (in the case when the packet to be processed is generated by the relay station (RN) itself), the relay station (RN) sets a QoS class identifier (QCI) indicating expected quality. The QCI may be set based on any proper criteria. In addition, the generated packet is mapped to a radio bearer of quality indicated by the QCI that is set.

In step S75, the radio bearer on which the received packet or the generated packet is mapped is transmitted to the base station (DeNB) in uplink or to the user apparatus (UE) in downlink.

Figure 8:
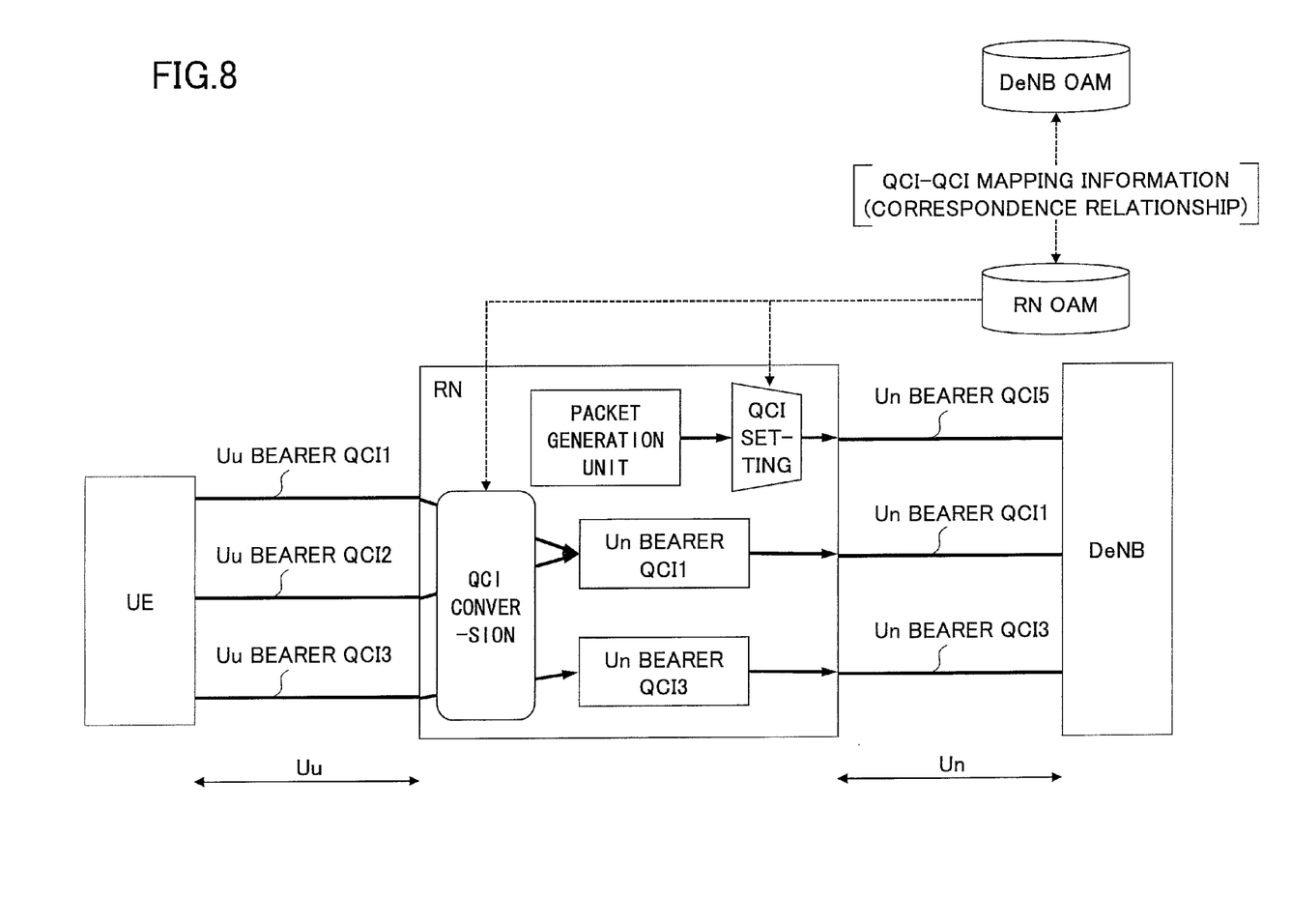
FIG. 8 is a diagram for explaining an operation example of a modified example.

FIG. 8 shows a situation in which QCI of a packet is set properly by the third modified example in uplink. Three radio bearers are set in the radio interface (Uu) between the user apparatus (UE) and the relay station (RN), and the values of QCI are QCI1, QCI2, and QCI3 respectively. The relay station (RN) receives these radio bearers and converts the radio bearers to QCI in the radio interface (Un) between the relay station (RN) and the base station (DeNB). In the case of the example shown in the figure, Uu bearer QCI1 and Uu bearer QCI2 are associated with Un bearer QCI1, and are transmitted to the base station (DeNB). The Uu bearer QCI3 is associated with Un bearer QCI3 and is transmitted to the base station (DeNB).

On the other hand, a proper QCI is set for a packet generated by the packet generation unit in the relay station (RN). In the example shown in the figure, Un bearer 5 is set, and is transmitted to the base station (DeNB). Conversion and setting of QCI are managed by RN-OAM (Operation Administration Management) that is a management node of the relay station (RN). RN-OAM is connected to DeNB-OAM that is a management node of the base station (DeNB), and shares the correspondence relationship of QCI. It is preferable but not essential that QCI is managed by the RN-OAM and the DeNB-OAM shown in FIG. 8. According to the present modified example, QCI is properly set and transmitted according to whether the packet to be transmitted from the relay station (RN) is a received packet or a packet generated by the relay station (RN).

In the above, one or more embodiments of the present invention has been explained while referring to the specific embodiments. However, these are merely exemplary. Those skilled in the art will conceive of various modified examples, corrected examples, alternative examples, substituted examples, and the like.

For example, one or more embodiments of the present invention may be applied to any suitable mobile communication system. For example, one or more embodiments of the present invention may be applied to systems of W-CDMA scheme, W-CDMA systems of the HSDPA/HSUPA scheme, systems of the LTE scheme, systems of the LTE-Advanced scheme, systems of the IMT-Advanced scheme, WiMAX, Wi-Fi scheme systems and the like.

While specific numerical value examples are used to facilitate understanding of one or more embodiments of the present invention, such numerical values are merely examples, and any appropriate value may be used unless specified otherwise. Classification into each embodiment or item in the description is not essential in accordance with one or more embodiments of the present invention, and features described in two or more items may be combined and used as necessary. Subject matter described in an item may be applied to subject matter described in another item (provided that they do not contradict).

For convenience of explanation, the apparatus according to one or more embodiments of the present invention has been explained by using a functional block diagram. However, the apparatus may be implemented in hardware, software, or a combination thereof. The software may be stored in any proper storage medium such as a RAM (Random Access Memory), a flash memory, a ROM (Read Only Memory), an EPROM(Erasable Programmable ROM), an EEPROM(Electronically Erasable and Programmable ROM), a register, a hard disk (HDD), a removable disk, a CD-ROM, a database, a server and the like.

Therefore, one or more embodiments of the present invention is not limited to the above-mentioned embodiment and is intended to include various variations, modifications, alterations, substitutions and so on without departing from the spirit of the present invention.

DESCRIPTION OF REFERENCE SIGNS 21 user apparatus (UE)
22 relay station (RN)
23 base station (DeNB)
24 packet data network gateway (P-GW)
41 packet generation unit
42 QCI setting unit
43 packet transmission unit
45 storage unit
46 packet receiving unit
47 QCI identifying unit
48 mapping unit
49 packet transmission unit
61 packet generation unit
62 QCI setting unit
63 packet transmission unit
64 packet receiving unit
65 packet generation unit
66 packet generating node identifying unit
67 QCI conversion unit
68 QCI setting unit
69 packet transmission unit

The invention claimed is:

1. A relay station for relaying radio communication from a first communication station to a second communication station, comprising:

a packet generation unit configured to generate a signal in the relay station;

a receiving unit configured to receive a signal from the first communication station;

a signal generating node identifying unit configured to identify whether a signal to be transmitted to the second communication station is a received signal received from the first communication station or a generated signal generated by the packet generation unit;

quality indicator conversion unit configured to associate the received signal with a radio bearer having a quality indicated by a second quality indicator corresponding to a first quality indicator determined from the received signal by referring to a predetermined correspondence relationship between first quality indicators in communication between the first communication station and the relay station, and second quality indicators in communication between the relay station and the second communication station, in a case when the signal to be transmitted to the second communication station is the received signal received from the first communication station;

a quality indicator setting unit configured to associate the generated signal with a radio bearer having a quality expected for radio communication of the generated signal, in a case when the signal to be transmitted to the second communication station is the generated signal generated by the packet generation unit; and a signal transmission unit configured to transmit both or one of the received signal and the generated signal associated with the radio bearer to the second communication station.

2. The relay station as claimed in claim 1, wherein the first quality indicator determined from the received signal is determined by a flow identifier extracted from the received signal.

3. The relay station as claimed in claim 1, wherein the first communication station is a user apparatus and the second communication station is a base station, or the first communication station is a base station and the second communication station is a user apparatus.

4. The relay station as claimed in claim 1, wherein, when the second quality indicator corresponding to the first quality indicator determined from the received signal is not defined in the predetermined correspondence relationship, the quality indicator conversion unit associates the received signal with a radio bearer having a quality indicated by the first quality indicator.

5. A relay method in a relay station for relaying radio communication from a first communication station to a second communication station, comprising:

identifying, by a signal generating node identifying unit, whether a signal to be transmitted to the second communication station is a received signal received from the first communication station or a generated signal generated by a packet generation unit of the relay station;

associating, by a quality indicator conversion unit, the received signal with a radio bearer having a quality indicated by a second quality indicator corresponding to a first quality indicator determined from the received signal by referring to a predetermined correspondence relationship between first quality indicators in communication between the first communication station and the relay station, and second quality indicators in communication between the relay station and the second communication station, in a case when the signal to be transmitted to the second communication station is the received signal received from the first communication station;

associating, by a quality indicator setting unit, the generated signal with a radio bearer having a quality expected for radio communication of the generated signal, in a case when the signal to be transmitted to the second communication station is the generated signal generated by a packet generation unit of the relay station; and transmitting, by a signal transmission unit, both or one of the received signal and the generated signal associated with the radio bearer to the second communication station.

6. The relay method as claimed in claim 5, wherein the first quality indicator determined from the received signal is determined by a flow identifier extracted from the received signal.

7. The relay method as claimed in claim 5, wherein the first communication station is a user apparatus and the second communication station is a base station, or the first communication station is a base station and the second communication station is a user apparatus.

8. The relay method as claimed in claim 5, wherein, when the second quality indicator corresponding to the first quality indicator determined from the received signal is not defined in the predetermined correspondence relationship, the quality indicator conversion unit associates the received signal with a radio bearer having a quality indicated by the first quality indicator.

* * * * *